(12) United States Patent
Smirnov

(10) Patent No.: US 12,225,307 B2
(45) Date of Patent: Feb. 11, 2025

(54) REFLECTIVE MODULE ASSEMBLY AND CAMERA MODULE INCLUDING REFLECTIVE MODULE ASSEMBLY

(71) Applicant: SAMSUNG ELECTRO-MECHANICS CO., LTD., Suwon-si (KR)

(72) Inventor: Viatcheslav Smirnov, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 225 days.

(21) Appl. No.: 17/987,914

(22) Filed: Nov. 16, 2022

(65) Prior Publication Data

US 2023/0217132 A1 Jul. 6, 2023

(30) Foreign Application Priority Data

Jan. 6, 2022 (KR) .................. 10-2022-0002127

(51) Int. Cl.
*H04N 25/75* (2023.01)
*H04N 25/76* (2023.01)
*H04N 25/77* (2023.01)

(52) U.S. Cl.
CPC ............. *H04N 25/75* (2023.01); *H04N 25/76* (2023.01); *H04N 25/77* (2023.01)

(58) Field of Classification Search
CPC ........ H04N 25/75; H04N 25/76; H04N 25/77; H04N 23/55; H04N 23/685; G02B 13/0065; G02B 26/0816; G02B 27/646; G02B 7/1805; G02B 7/1821; G03B 2205/0015; G03B 2205/003; G03B 30/00; G03B 2205/0069; G03B 17/17; G03B 5/00; G03B 17/02; G03B 5/02; G03B 17/12; G03B 2205/0007; G03B 2205/0046; H02K 33/18

See application file for complete search history.

(56) References Cited

U.S. PATENT DOCUMENTS

2019/0129197 A1 5/2019 Kim et al.
2020/0348479 A1 11/2020 Kwon et al.
2022/0279093 A1 9/2022 Kwon et al.

FOREIGN PATENT DOCUMENTS

CN 107238913 A 10/2017
CN 107888834 A 4/2018
(Continued)

OTHER PUBLICATIONS

Korean Office Action issued on Dec. 5, 2023, in counterpart Korean Patent Application No. 10-2022-0002127 (7 pages in English, 5 pages in Korean).

*Primary Examiner* — Yogesh K Aggarwal
(74) *Attorney, Agent, or Firm* — NSIP Law

(57) ABSTRACT

A reflective module assembly is provided. The reflective module assembly includes a fixed body, a moving body configured to rotate with respect to the fixed body, a reflective member disposed in the moving body, the reflective member configured to change a direction of a path of light incident in a first optical axis direction to a second optical axis direction, three ball members spaced apart from a rotational axis of the moving body, the three ball members configured to rotatably support the moving body, and a groove arrangement disposed on at least one of the moving body and the fixed body, and configured to contact with the three ball members. The three ball members and the groove arrangement form six contact points.

18 Claims, 9 Drawing Sheets

(56) References Cited

FOREIGN PATENT DOCUMENTS

| | | | |
|---|---|---|---|
| KR | 10-2015-0089675 A | 8/2015 | |
| KR | 10-1942743 B1 | 1/2019 | |
| KR | 10-2019-0071569 A | 6/2019 | |
| KR | 10-2019-0134144 A | 12/2019 | |
| KR | 20190134144 A * | 12/2019 | ............ G02B 26/08 |
| KR | 10-2020-0126873 A | 11/2020 | |
| KR | 10-2021-0077656 A | 6/2021 | |
| KR | 10-2022-0000875 A | 1/2022 | |
| WO | WO 2019/117652 A1 | 6/2019 | |

* cited by examiner

REFLECTIVE MODULE ASSEMBLY AND CAMERA MODULE INCLUDING REFLECTIVE MODULE ASSEMBLY

CROSS-REFERENCE TO RELATED APPLICATIONS

This application claims the benefit under 35 USC § 119(a) of Korean Patent Application No. 10-2022-0002127 filed on Jan. 6, 2022, in the Korean Intellectual Property Office, the entire disclosure of which is incorporated herein by reference for all purposes.

BACKGROUND

1. Field

The following description relates to a reflective module assembly, and a camera module including the reflective module assembly.

2. Description of Related Art

With the development of communications technology, mobile devices, such as smartphones, are widely used, and accordingly, the demand for various operations of cameras included in the mobile devices has also increased. For example, the camera included in the mobile device may provide advanced image-capturing operations (for example, an autofocus operation, an optical image stabilization (OIS) operation, a zoom operation, and the like) implemented in a typical digital single-lens reflex (DSLR) camera, despite a small size thereof.

It is advantageous to implement a compact camera by forming a path of light that is folded several times, rather than having a straight light path. A folded (or foldable) camera may bend or reflect a path of light one or more times using an optical path changing member such as a prism or mirror, thereby reducing a height or size of the camera. In the folded camera, an anti-shake operation may be implemented by moving the prism. For example, the folded camera may compensate for vibrations or shaking of the camera by rotating the prism.

A variety of actuators may be used to drive the prism. However, due to a very small-sized mobile camera, an actuator that drives the prism in a compact and stable manner is desirous.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

In a general aspect, a reflective module assembly includes a fixed body; a moving body configured to rotate with respect to the fixed body; a reflective member disposed in the moving body, the reflective member configured to change a direction of a path of light incident in a first optical axis direction to a second optical axis direction; three ball members spaced apart from a rotational axis of the moving body, the three ball members configured to rotatably support the moving body; and a groove arrangement disposed on at least one of the moving body and the fixed body, and configured to contact the three ball members, wherein the three ball members and the groove arrangement form six contact points.

The rotational axis may pass through a triangle having vertices located at centers of each of the three ball members.

The three ball members may be configured to have a kinematic coupling structure.

The three ball members may include a first ball member, a second ball member, and a third ball member disposed on a circumference of the rotational axis.

The groove arrangement may include a first groove configured to form two contact points with the first ball member; a second groove configured to form three contact points with the second ball member; and a third groove configured to form one contact point with the third ball member.

The groove arrangement may include three V-shaped grooves disposed on different positions of the at least one of the moving body and the fixed body, and the three V-shaped grooves may respectively form two contact points with one of the three ball members.

The reflective module assembly may include a guide groove disposed in the other of the moving body and the fixed body in which the groove arrangement is not disposed, the guide groove configured to extend along a circumference of the rotational axis, wherein the three ball members are accommodated in the guide groove.

The reflective module assembly may include a driving coil and a driving magnet respectively disposed in one and the other of the moving body and the fixed body, wherein the driving coil and the driving magnet oppose each other in a direction of the rotational axis.

The driving magnet may be configured to extend along a circular arc about the rotational axis.

The driving magnet may be disposed radially farther than the three ball members about the rotational axis.

The reflective module assembly may include a pulling magnet and a pulling yoke respectively disposed in one and the other of the moving body and the fixed body, wherein the rotational axis passes through at least one of the pulling magnet and the pulling yoke.

The reflective module assembly may include a housing; a supporter that is rotatable with respect to the housing; and a holder that is rotatable with respect to the supporter, wherein the fixed body is the housing, the moving body is the supporter, and the rotational axis is perpendicular to both the first optical axis and the second optical axis.

The reflective module assembly may include a shaft which extends along the rotational axis from one of the supporter and the housing, the shaft having a conical end; and an accommodating groove disposed in the other of the supporter and the housing, the accommodating groove configured to accommodate the conical end of the shaft.

The reflective module assembly a shaft which extends from the supporter along the rotational axis, the shaft configured to have an end at which a first accommodating groove is disposed; a support member coupled to the housing, the support member comprising a second accommodating groove which opposes the first accommodating groove in a direction of the rotational axis; and a ball member which is fitted between the first accommodating groove and the second accommodating groove.

The reflective module assembly may include a housing; a supporter rotatable with respect to the housing; and a holder which is rotatable with respect to the supporter, wherein the fixed body is the supporter, the moving body is the holder, and the rotational axis is parallel to the first optical axis.

A camera module may include the reflective module assembly, and a lens module configured to receive light emitted from the reflective member, the lens module comprising a plurality of lenses arranged in a direction of the second optical axis.

In a general aspect, a reflective module assembly includes a first body; a second body rotatable about a rotational axis with respect to the first body; a reflective member disposed in one of the first body and the second body, the reflective member configured to change a path of incident light; three ball members disposed between the first body and the second body, and configured to move in a circumferential direction of the rotational axis; a groove arrangement disposed in the first body, the groove arrangement configured to be in contact with the three ball members; and a guide portion disposed in the second body, the guide portion configured to guide a movement of the three ball members, wherein a position of at least one of the three ball members is fixed with respect to the groove arrangement.

The three ball members may be configured to have a kinematic coupling structure.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
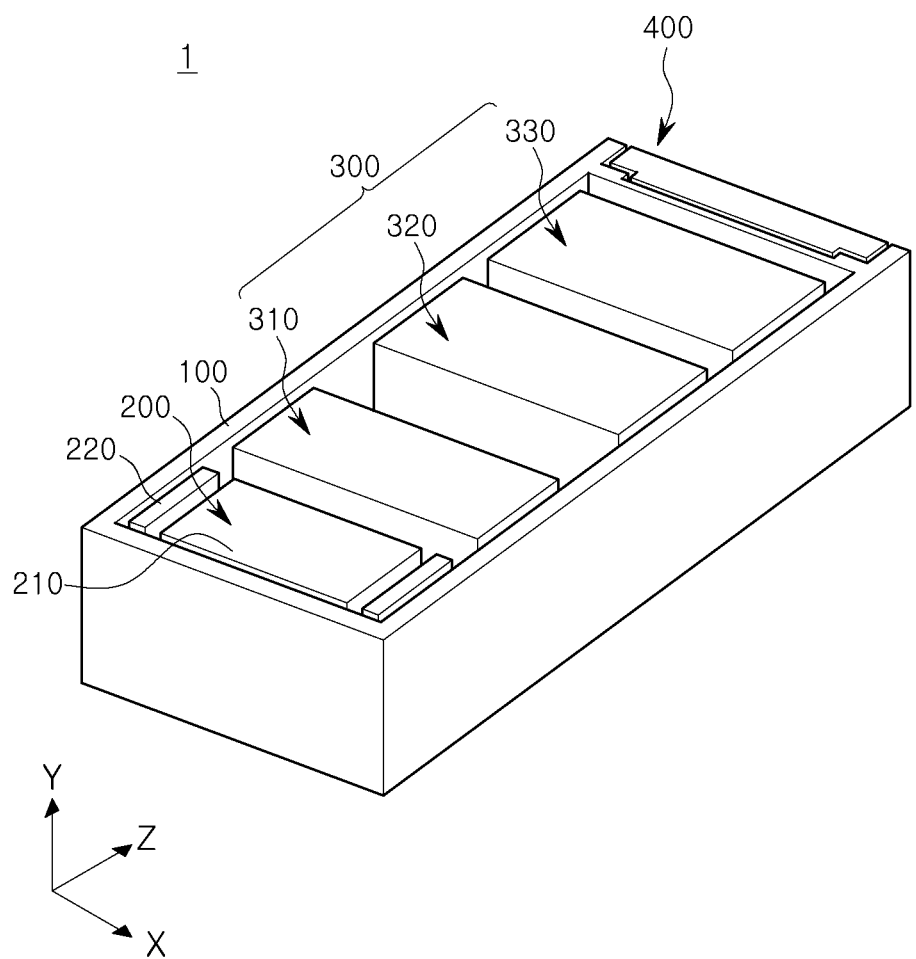
FIG. 1 schematically illustrates a configuration of an example camera module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

In addition, the same reference numerals or symbols described in the attached drawings denote parts or components that actually perform the same functions. For ease of descriptions and understanding, the same reference numerals or symbols are used and described in different embodiments. In other words, although components having the same reference numerals are all illustrated in a plurality of drawings, the plurality of drawings do not mean one example embodiment.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

As used herein, it will be further understood that the terms "comprises" and/or "comprising," when used in this specification, specify the presence of stated features, integers, steps, operations, elements, components or a combination thereof, but do not preclude the presence or addition of one or more other features, integers, steps, operations, elements, components, and/or groups thereof.

As used herein, an X-direction, a Y-direction, and a Z-direction refer to a direction, parallel to an X-axis, a direction, parallel to a Y-axis, and a direction, parallel to a Z-axis illustrated in the drawings, respectively. In addition, unless otherwise described, the X-direction is based on a concept including both a +X-axis direction and a −X-axis direction, which is also applied to the Y-direction and the Z-direction.

As used herein, two directions (or axes) parallel to or perpendicular to each other includes two directions (or axes) are substantially parallel to each other. For example, a first axis and a second axis perpendicular to each other refer to a first axis and a second axis forming an angle of 90 degrees or an angle close to 90 degrees.

As used herein, paragraphs beginning with "in an example embodiment" do not necessarily refer to the same example embodiments. The particular features, structures, or characteristics may be combined in any suitable manner consistent with the present disclosure.

As used herein, "configured to" means that a component includes a structure necessary for implementing a function.

Hereinafter, example embodiments will be described in detail with reference to the drawings. However, the spirit of the one or more examples is not limited to the presented example embodiments. For example, a person skilled in the art, and understanding the spirit of the examples, would be able to propose other example embodiments included within the scope of the one or more examples through the addition, change, or deletion of components. All such variations are also within the scope of the examples.

One or more examples relate to a camera module which provides an optical image stabilization (OIS) function and an autofocus control function.

One or more examples may also include a folded camera which includes an actuator for OIS, where the actuator is drivable in a compact and precise manner.

One or more examples provide an actuator for optical image stabilization (OIS) in a folded camera, the actuator being drivable in a compact and precise manner.

FIG. 1 schematically illustrates a configuration of a camera module 1, in accordance with one or more embodiments.

Referring to FIG. 1, the camera module 1 may include a housing 100, a reflective module 200, a lens module 300, and a sensor module 400.

Figure 2:
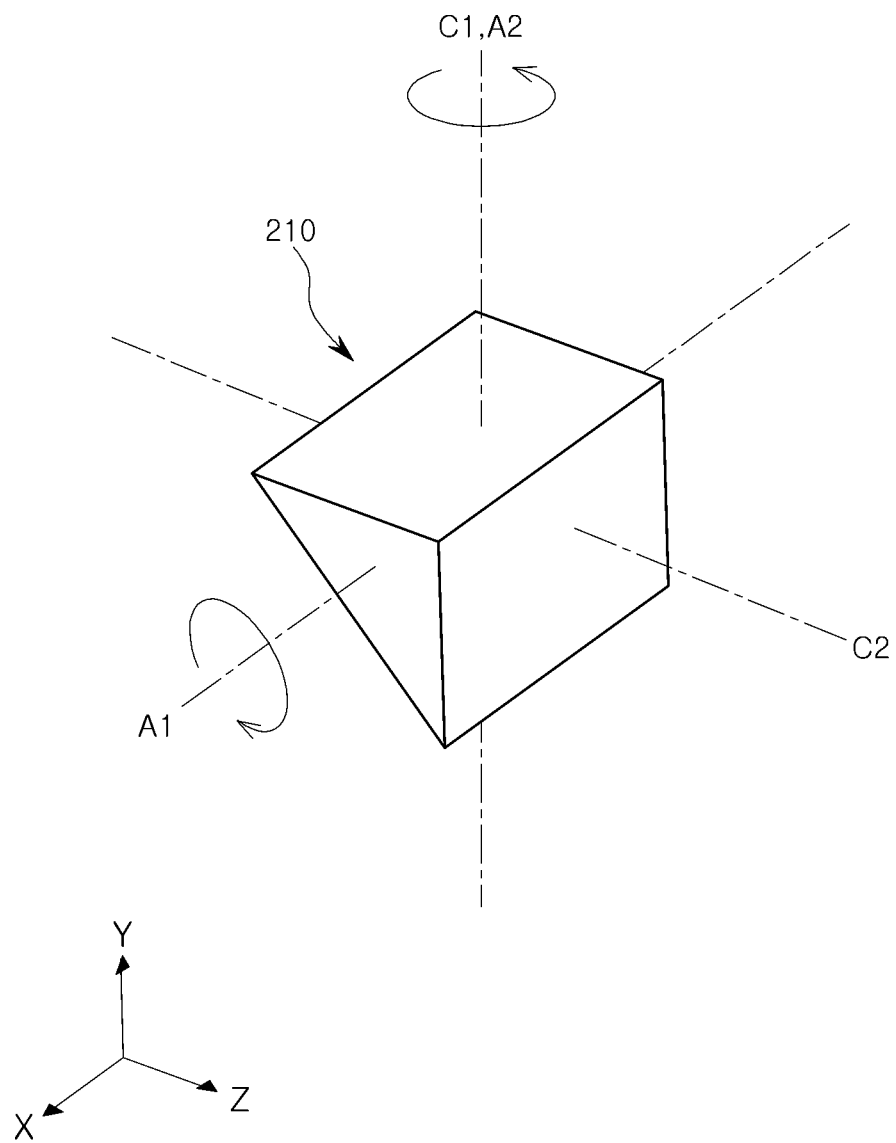
FIG. 2 is a diagram illustrating movement of a reflective member, in accordance with one or more embodiments.

The reflective module 200 may be accommodated in the housing 100, and may include a reflective member 210. The reflective member 210 may change a path of light incident to the camera module 1. The reflective member 210 may be, for example, a prism or a mirror. The reflective member 210 may bend light incident on a first optical axis C1 toward a second optical axis C2 (FIG. 2). The first optical axis C1 and the second optical axis C2 may intersect each other. For example, the first optical axis C1 may be parallel to a Y-axis, and the second optical axis C2 may be parallel to a Z-axis. As used herein, it may be understood that the reflective module 200 is based on a concept including some or all of the reflective member 210, driving elements that drive the reflective member 210, and the housing 100 that accommodates the reflective member 210 and the driving elements.

The lens module 300 may include at least one lens and at least one lens barrel that accommodates the at least one lens, respectively. In an example, the at least one lens may be aligned along the second optical axis C2. Alternatively, the at least one lens may define the second optical axis C2. At least a portion of the lens module 300 may move with respect to the housing 100 along the second optical axis C2.

In an example, a plurality of lens modules 300 may be disposed in the camera module 1. For example, as illustrated in FIG. 1, the lens module 300 may include a first lens module 310, a second lens module 320, and a third lens module 330. A first portion of the plurality of lens modules 310, 320, and 330 may be fixed to the housing 100, and a second portion of the plurality of lens modules 310, 320, and 330 may move with respect to the housing 100 along the second optical axis C2. For example, the second lens module 320 and the third lens module 330 may move along the second optical axis C2, respectively. As a distance between the lens modules 310, 320, and 330 is adjusted, a magnification may be adjusted. Additionally, as a distance between an image sensor of the sensor module 400 and the lens module 300 is adjusted, a focus may be adjusted.

In FIG. 1, the lens module 300 and the reflective module 200 are accommodated in the same housing 100, but such a configuration is merely an example. For example, in example embodiments, the lens module 300 and the reflective module 200 may be provided as different parts in separate housings, respectively, and then may be assembled with each other. The sensor module 400 may also be provided as a part that is separate from the reflective module 200 or the lens module 300, and then may be assembled.

Figure 3:
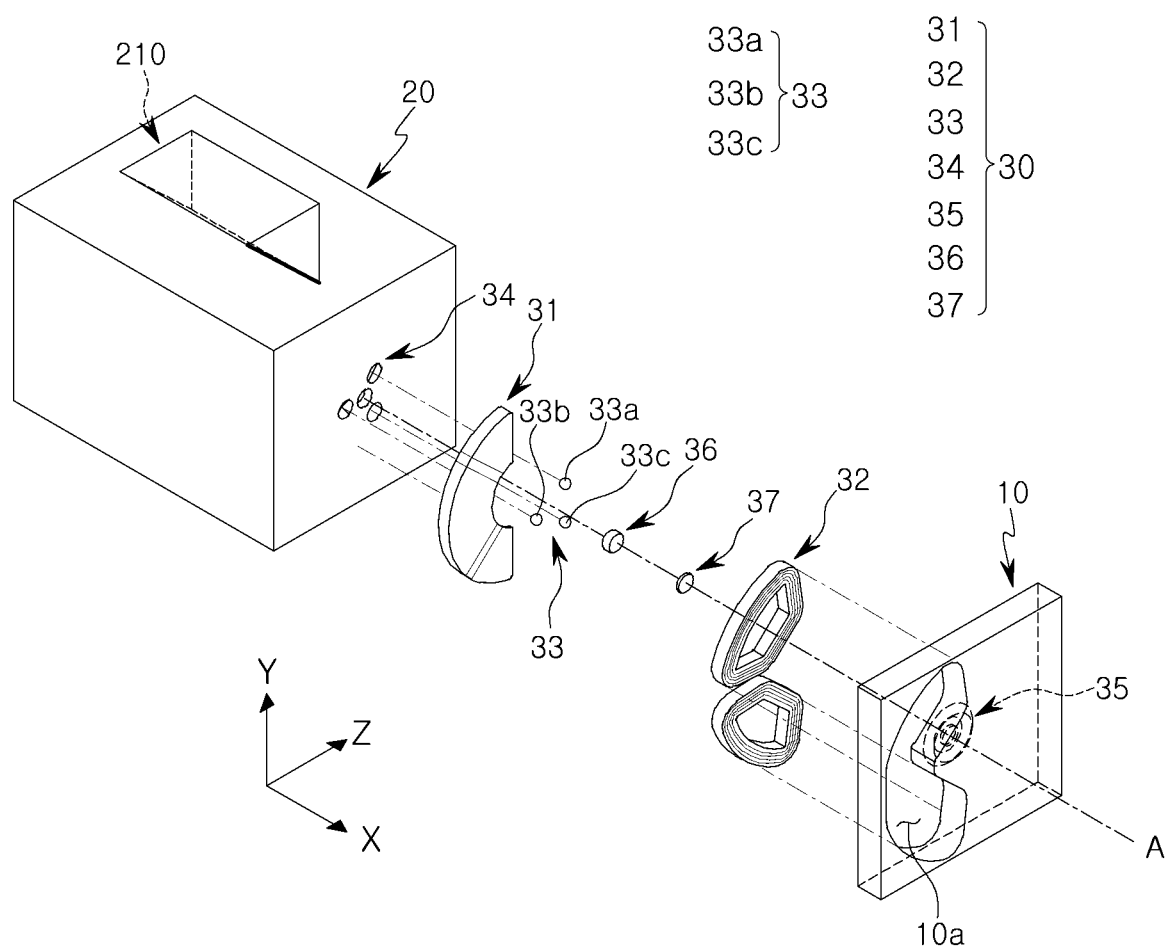
FIG. 3 illustrates a driver rotating a reflective member, in accordance with one or more embodiments.
Figure 4:
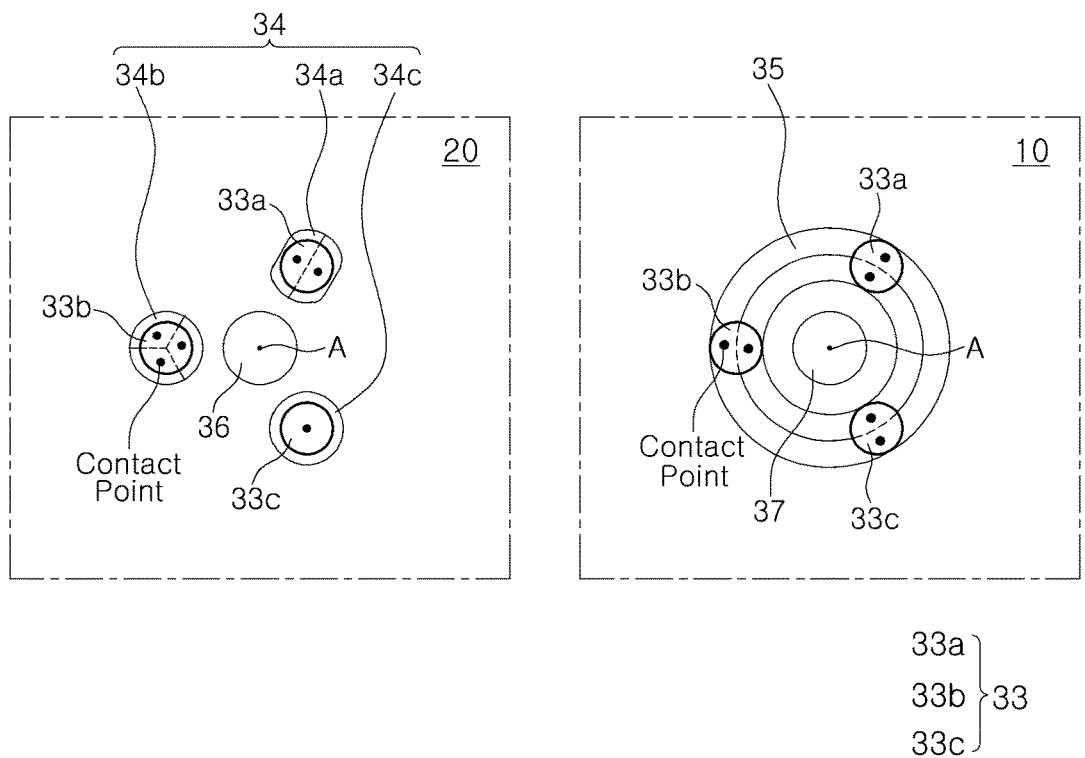
FIG. 4 and FIG. 5 schematically illustrate a ball guide structure implementing a kinematic coupling, in accordance with one or more embodiments.
Figure 5:
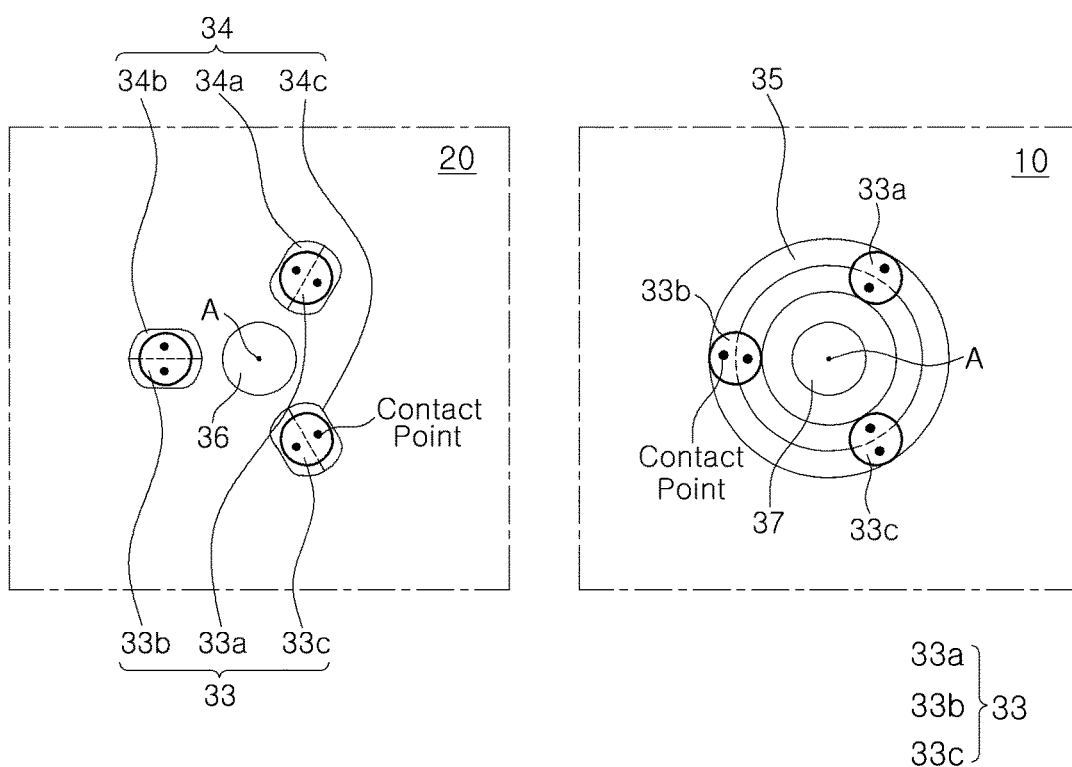

FIG. 2 illustrates movement of the reflective member 210 according to example embodiments. FIG. 3 illustrates a driver that rotates the reflective member 210 according to example embodiments. FIGS. 4 and 5 schematically illustrate a ball guide structure implementing a kinematic coupling according to example embodiments.

Referring to FIG. 2, the reflective member 210 may change a path of light entering along the first optical axis C1 toward the second optical axis C2. The reflective member 210 may rotate about an axis (for example, A1 and A2 in FIG. 2), perpendicular to the second optical axis C2, with respect to the lens module (for example, 300 in FIG. 1). The second optical axis C2 may be an optical axis of the lens module 300. The reflective member 210 may perform an optical image stabilization (OIS) operation by rotating the reflective member 210 about an axis, perpendicular to the second optical axis C2.

In example embodiments, the reflective member 210 may rotate about two axes, perpendicular to the second optical axis C2, and the two axes may intersect each other. That is, the reflective member 210 may rotate about a first axis A1 and a second axis A2, perpendicular to the second optical axis C2. The first axis A1 and the second axis A2 may intersect each other. For example, the first axis A1 may be perpendicular or substantially perpendicular to the first optical axis C1 and the second optical axis C2. The second axis A2 may be parallel to the first optical axis C1.

As illustrated in FIG. 2, in example embodiments, the first axis A1 may be an axis passing through the reflective member 210. However, a position of the first axis A1 is not limited to the above described. For example, the first axis A1 may be disposed in a position substantially corresponding to an outer surface of the reflective member 210 or a position having a predetermined distance from the reflective member 210.

Referring to FIG. 3, the reflective module 200 may include a fixed body 10, a moving body 20 which rotates about a rotational axis A with respect to the fixed body 10. The reflective member 210 may be coupled to the moving body 20. The reflective member 210 may be fixedly coupled to the moving body 20 or may be movably coupled to the moving body 20. As the moving body 20 rotates about the rotational axis A with respect to the fixed body 10, the reflective member 210 may rotate about the rotational axis A together with the moving body 20. Accordingly, even when incident light is incident on the reflective module 200 in various directions, the reflection member 210 may properly rotate to change a path of the incident light in a predetermined direction (for example, a Z-axis direction in FIG. 3).

In example embodiments, the reflective member 210 may be disposed in various positions within the moving body 20. An orientation of the reflective member 210 displayed in the moving body 20 in FIG. 3 is merely an example, and the reflective member 210 may be disposed in the moving body 20 to face in various directions.

Referring to FIG. 3, the reflective module 200 may include an OIS driver 30 that rotates the moving body 20 with respect to the fixed body 10. The OIS driver 30 may include a driving magnet 31 and a driving coil 32 opposing each other. The driving coil 32 and the driving magnet 31 may be respectively disposed in one of the moving body 20 and the fixed body 10. For example, referring to FIG. 3, the driving magnet 31 may be coupled to the moving body 20, and the driving coil 32 may be coupled to the fixed body 10. A coil groove 10a, in which at least a portion of the driving coil 32 is accommodated, may be disposed in the fixed body 10, and thus the reflective module 200 may be manufactured to have a more compact structure. Through electromagnetic interaction between the driving coil 32 and the driving magnet 31, the moving body 20 may rotate about the rotational axis A with respect to the fixed body 10.

At least a portion of the driving magnet 31 may be formed to extend in a circumferential direction about the rotational axis A. For example, as illustrated in FIG. 3, the driving magnet 31 may be formed to be similar to that of a portion of a torus. The driving coil 32 may be provided in a form corresponding to the driving magnet 31. The driving coil 32 may include one or two or more coils. Although not illustrated, the OIS driver 30 may include a position sensor that measures an amount of rotation of the moving body 20. The position sensor may be, as examples, a Hall sensor or a magnetoresistance sensor. In this example, the position sensor may be disposed to oppose the driving magnet 31 or to oppose a separately provided magnet. The position sensor may be disposed on an inside or outside of a coil.

The driving magnet 31 and the driving coil 32 may oppose each other in a direction, parallel to the rotational axis A, and may rotate with respect to each other while maintaining a distance therebetween. That is, a surface of the driving magnet 31 opposing the driving coil 32 and a surface of the driving coil 32 opposing the driving magnet 31 may be perpendicular to the rotational axis A. Accordingly, even when the moving body 20 rotates with respect to the fixed body 10, a constant distance between the driving magnet 31 and the driving coil 32 may be maintained, which may contribute to precise implementation of OIS driving.

In example embodiments, the driving magnet 31 (or the driving coil 32) may be disposed radially outward from the ball members 33a, 33b, and 33c about the rotational axis A. For example, when viewed in a direction of the rotational axis A, the ball members 33a, 33b, and 33c may be positioned in an inner region of an inner diameter of the driving magnet 31. A ball group 33 supporting rotation of the moving body 20 may be positioned on an inside of the driving magnet 31 or the driving coil 32, thereby implementing the OIS driver 30 in a compact manner.

The OIS driver 30 may include a ball guide structure that guides and supports a rotation of the moving body 20. In example embodiments, the OIS driver 30 may include the ball group 33 disposed between the moving body 20 and the fixed body 10. The ball group 33 may include at least three ball members 33a, 33b, and 33c. The three ball members 33a, 33b, and 33c may be arranged in a circumferential direction about the rotational axis A. The three ball members 33a, 33b, and 33c may be arranged on circumferences about the rotational axis A, the circumferences having different radii, or may be arranged on a single circumference having the same radius.

The OIS driver 30 may include a groove that partially accommodates the three ball members 33a, 33b, and 33c. The OIS driver 30 may include a groove arrangement 34 provided in at least one of the moving body 20 and the fixed body 10. The OIS driver 30 may partially accommodate the ball group 33 on an opposite side of the groove arrangement 34, and may include a guide portion that guides movement of the three ball members 33a, 33b, and 33c. For example, the guide portion may be a guide groove 35 which forms a path through which the three ball members 33a, 33b, and 33c move. The guide groove 35 may extend in the circumferential direction about the rotational axis A. For example, the guide groove 35 may be a circular groove.

The groove arrangement 34 may be disposed on a first side of the ball group 33, and the guide groove 35 may be disposed on a second side of the ball group 33 to accommodate at least a portion of the ball group 33, respectively. In FIG. 3, in a non-limited example, the groove arrangement 34 may be provided in the moving body 20, and the guide groove 35 may be provided in the fixed body 10. However, such a configuration is merely an example. In another example embodiment, the groove arrangement 34 and the guide groove 35 may be disposed in the fixed body 10 and the moving body 20, respectively.

Referring to FIG. 4, the groove arrangement 34 may be arranged in the circumferential direction about the rotational axis A to include a first groove 34a, a second groove 34b, and a third groove 34c that accommodate the first ball member 33a, the second ball member 33b, and the third ball member 33c, respectively. The plurality of grooves 34a, 34b, and 34c included in the groove arrangement 34 may accommodate the three ball members 33a, 33b, and 33c, respectively.

In example embodiments, a total of six contact points may occur between the groove arrangement 34 and the three ball members 33a, 33b, and 33c. That is, a sum of the number of contact points formed by the first ball member 33a with the first groove 34a, the number of contact points formed by the second ball member 33b with the second groove 34b, and the number of contact points formed by the third ball member 33c with the third groove 34c may be six. In an example, "contact point" may be considered as a contact portion (contact point) between a ball member and a groove. The contact portion may be in the form of an approximately one point, or may have a predetermined area according to physical properties or the determined curvature of the ball member or groove.

FIGS. 4 and 5 illustrate various shapes of the groove arrangement 34 and the guide groove 35 according to example embodiments.

For example, referring to the left drawing of FIG. 4, the first groove 34a and the first ball member 33a may form two contact points, the second groove 34b and the second ball member 33b may form three contact points, and the third groove 34c and the third ball member 33c may form one contact point. The first groove 34a may be a groove having a "V"-shaped cross-section (hereinafter, a "V-shaped groove"). The second groove 34b may have a concave tetrahedron shape. The third groove 34c may have a flat bottom surface such that the third groove 34c has one contact point with the third ball member 33c.

Alternatively, referring to the left drawing of FIG. 5, in example embodiments, the first groove 34a, the second groove 34b, and the third groove 34c, V-shaped grooves extending in a radial direction, may form two contact points with the three ball members 33a, 33b, and 33c, respectively.

As the moving body 20 rotates with respect to the fixed body 10, the three ball members 33a, 33b, and 33c may move along the guide groove 35. In this example, the ball members 33a, 33b, and 33c may move in the circumferential direction about the rotational axis A of the moving body 20. For example, the first ball member 33a, the second ball member 33b, and the third ball member 33c may be disposed in a fixed position with respect to the first groove 34a, the second groove 34b, and the third groove 34c, and may rotate about the rotational axis A along the guide groove 35. Referring to right sides of FIGS. 4 and 5, the ball members 33a, 33b, and 33c may form two contact points with the guide groove 35, respectively.

A structure between the ball group 33 and the groove arrangement 34 may be an application of a so-called kinematic coupling. FIG. 4 illustrates an application of a Kelvin coupling, and FIG. 5 illustrates an application of a Maxwell coupling. According to a kinematic coupling structure, a rotational axis of a moving body may pass through a triangle having the three ball members 33a, 33b, and 33c as vertices.

A kinematic coupling applied to a reflective module according to example embodiments may increase accuracy of alignment between the moving body 20 and the fixed body 10. That is, through the kinematic coupling structure, the rotational axis A of the moving body 20 may be aligned at an accurate position with respect to the fixed body 10. Additionally, backlash between the ball members 33a, 33b, and 33c and the groove arrangement 34 may be zero. Accordingly, rotation of the moving body 20 may be controlled very precisely. Additionally, even when the OIS driver 30 does not operate (that is, when no current flows in the driving coil 32), shaking between the moving body 20 and the fixed body 10 may be prevented or minimized.

The OIS driver 30 may include a pulling device that adheres the moving body 20 to the fixed body 10. In example embodiments, the OIS driver 30 may include a pulling magnet 36 and a pulling yoke 37 that oppose each other. The pulling magnet 36 and the pulling yoke 37 may be coupled to the moving body 20 or the fixed body 10, respectively. A magnetic force may be generated between the pulling magnet 36 and the pulling yoke 37, which causes the moving body 20 and the fixed body 10 to be pulled toward each other. Accordingly, the ball group 33 may maintain contact with the groove arrangement 34 and the guide groove 35, which may allow the moving body 20 to precisely and smoothly rotate with respect to the fixed body 10. The pulling yoke 37 may be replaced with a magnet.

In FIG. 3, the pulling magnet 36 and the pulling yoke 37 may be coupled to the moving body 20 and the fixed body 10, respectively, but such a configuration is merely an example. For example, the pulling magnet 36 and the pulling yoke 37 may be coupled to the fixed body 10 and the moving body 20, respectively.

In example embodiments, the pulling magnet 36 and the pulling yoke 37 may be arranged along the rotational axis A. That is, the pulling magnet 36 and the pulling yoke 37 may oppose each other in a direction, parallel to the rotational axis A, and the rotational axis A may be disposed to pass through the pulling magnet 36 and the pulling yoke 37.

Figure 6:
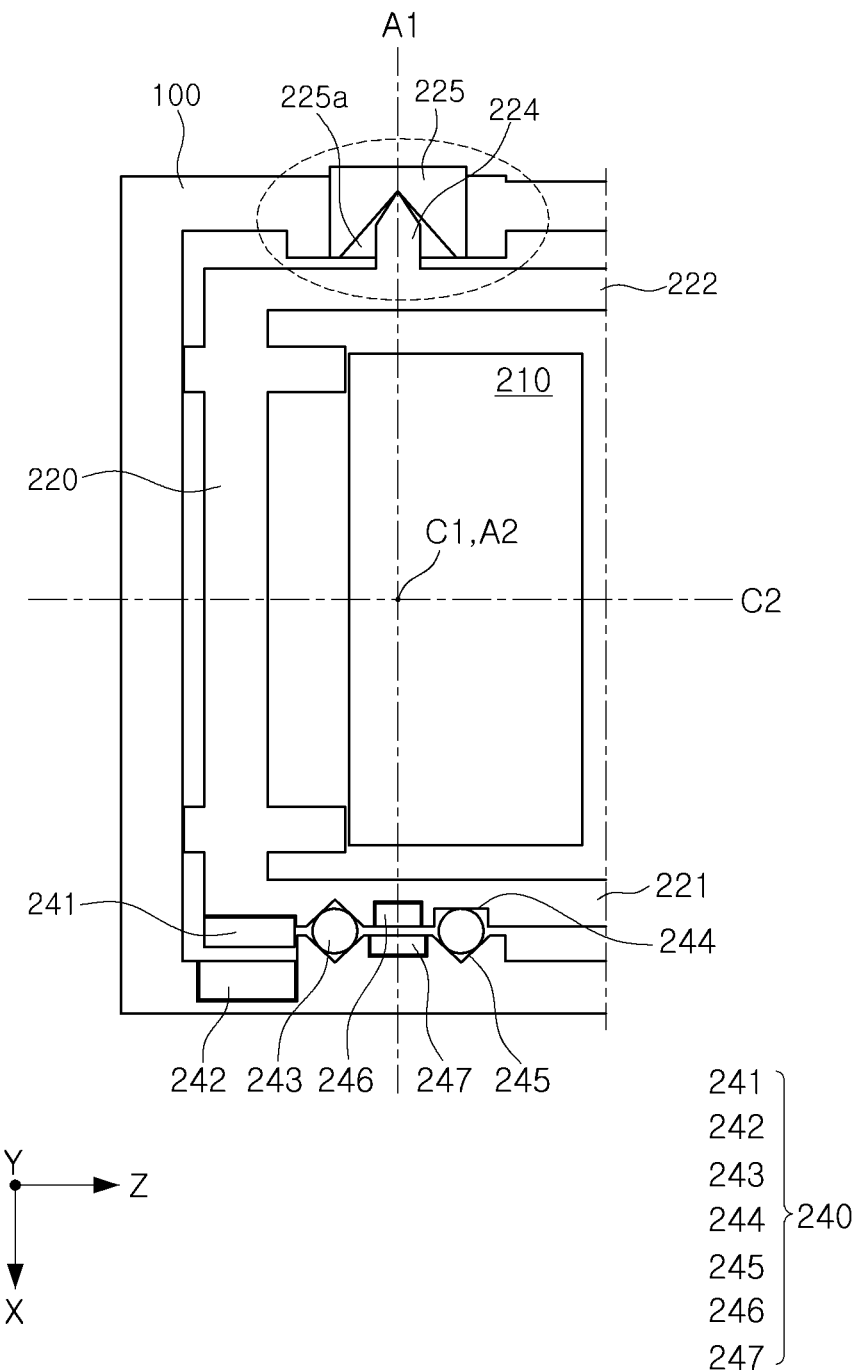
FIG. 6 illustrates a supporter supported on a housing, in accordance with one or more embodiments.
Figure 7:
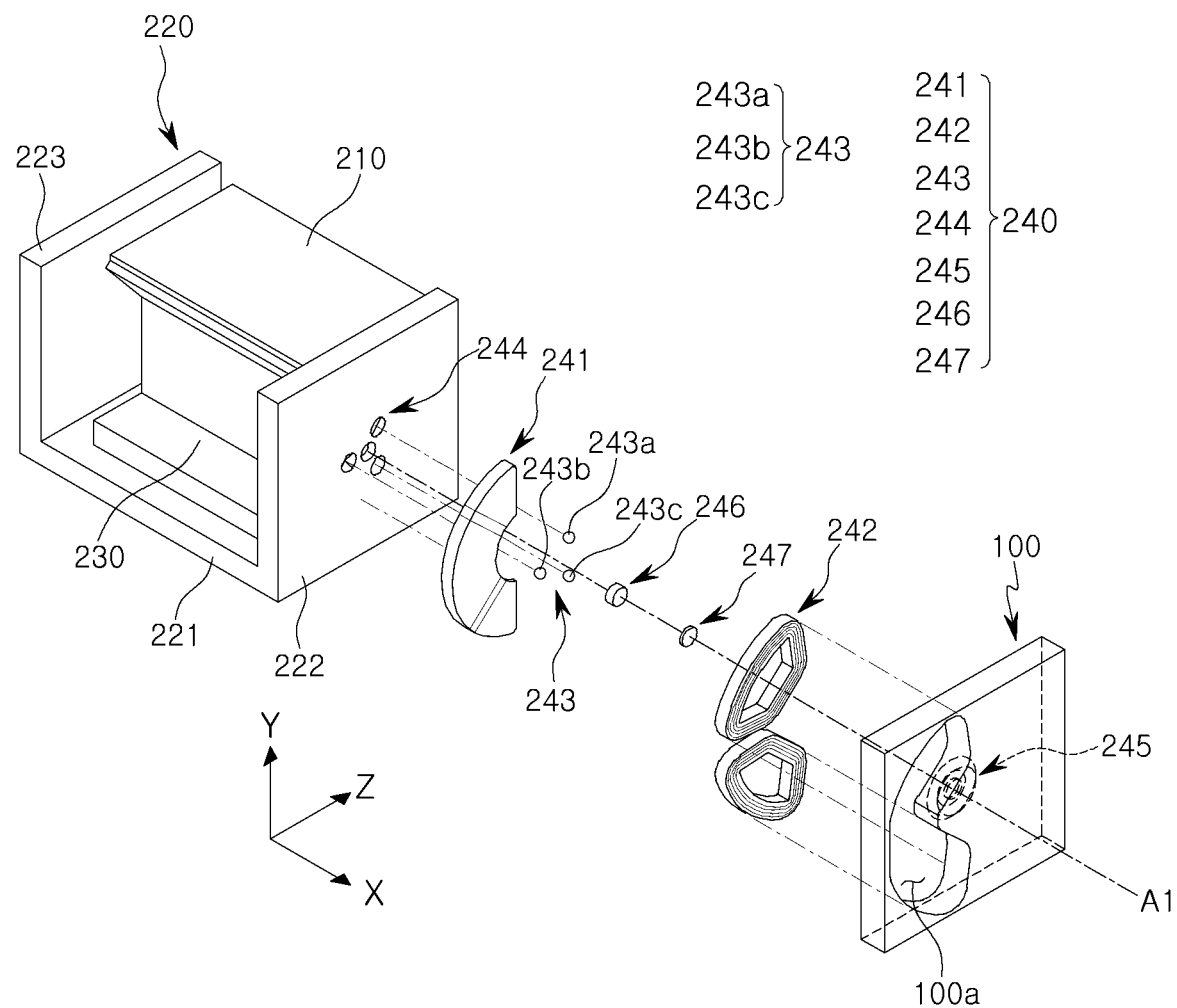
FIG. 7 illustrates an OIS driver disposed between a supporter and a housing, in accordance with one or more embodiments.
Figure 8:
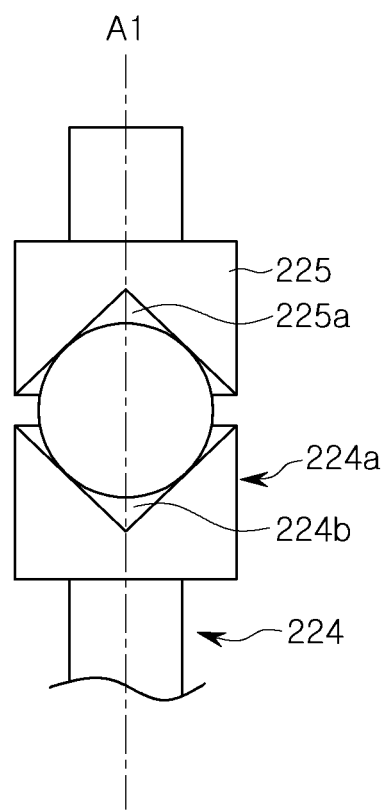
FIG. 8 illustrates a structure supporting rotation of a supporter on an opposite side of a ball group, in accordance with one or more embodiments.
Figure 9:
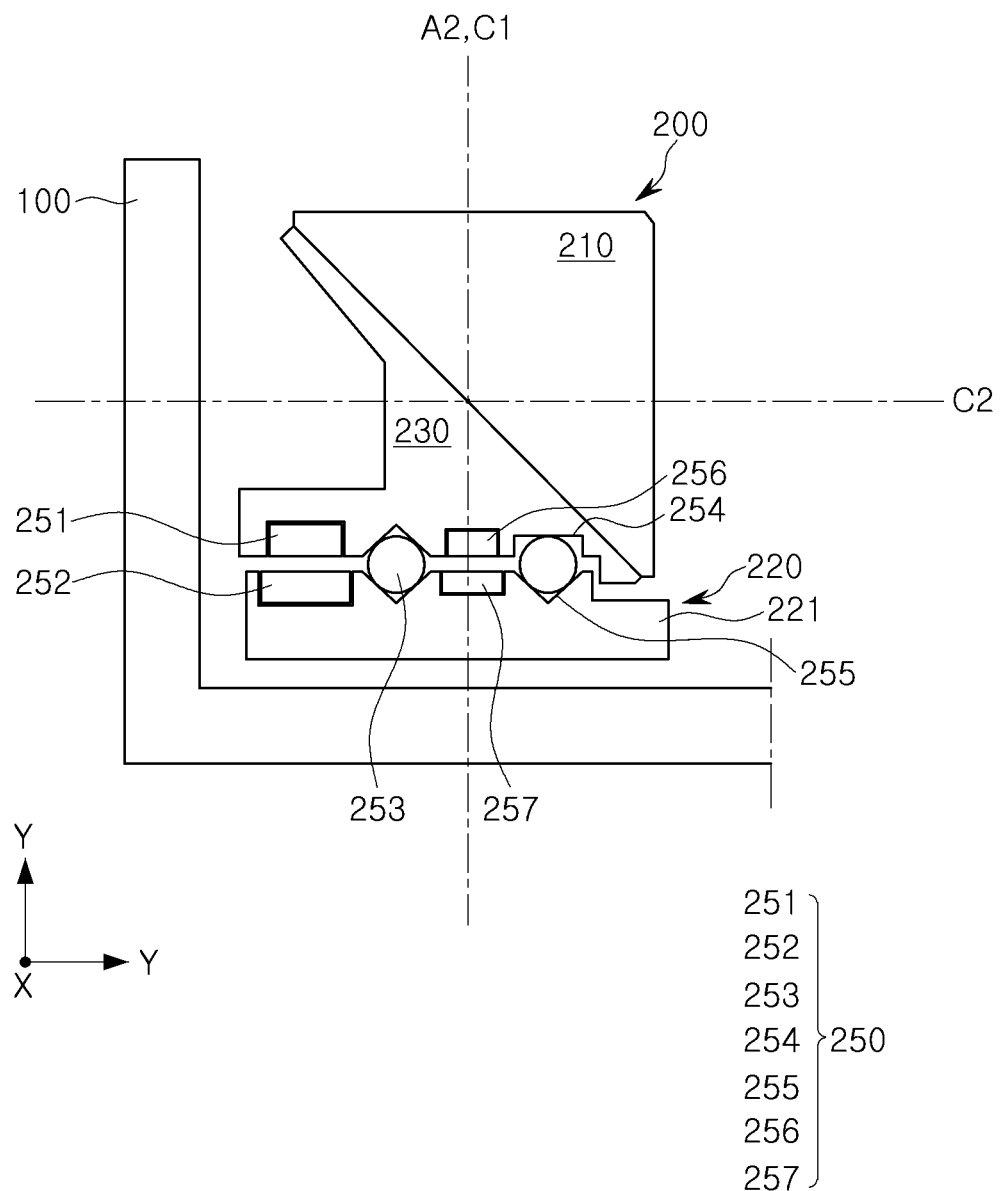
FIG. 9 illustrates a holder supported on a supporter, in accordance with one or more embodiments.
Figure 10:
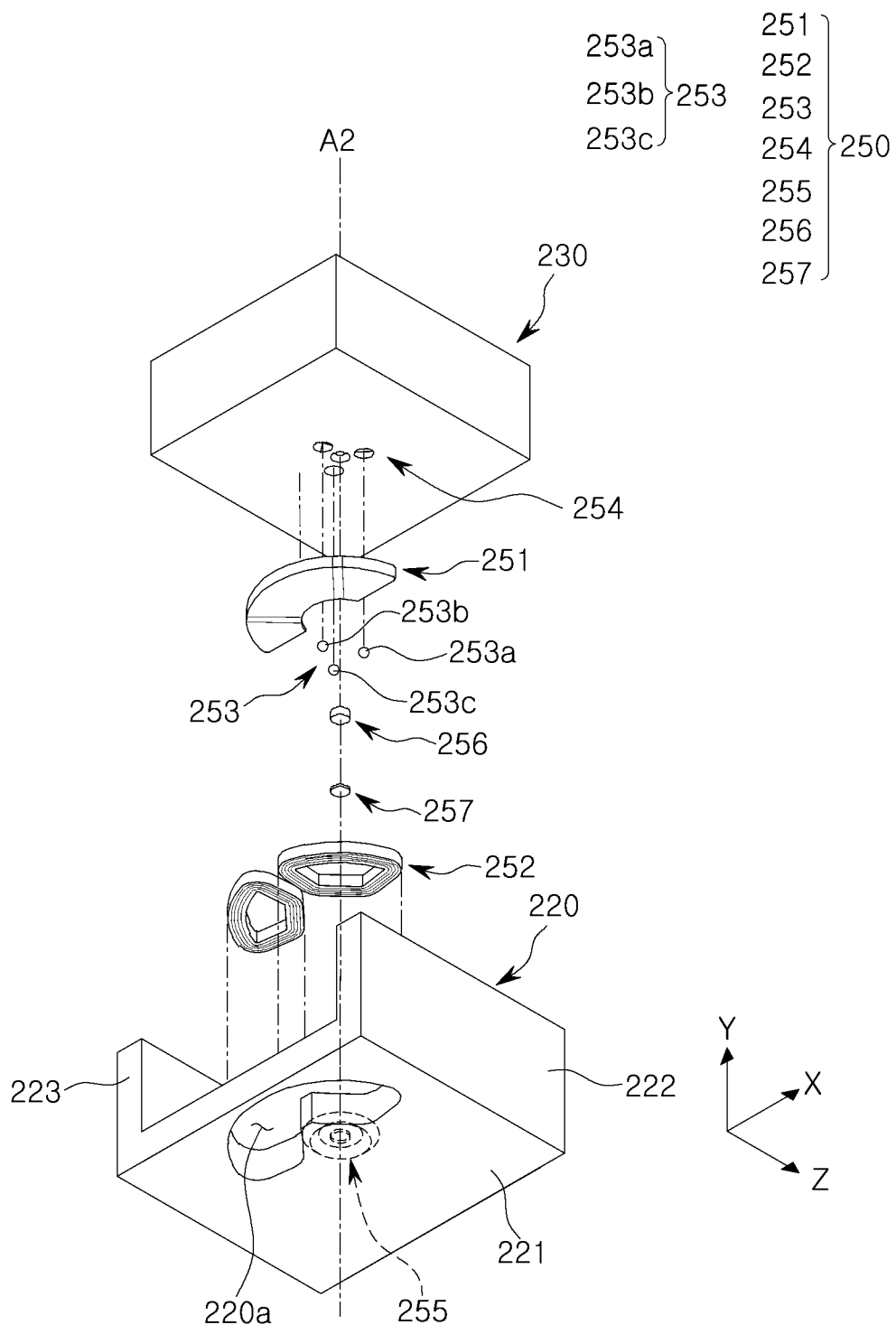
FIG. 10 illustrates an OIS driver disposed between a supporter and a holder, in accordance with one or more embodiments.

FIG. 6 illustrates a supporter 220 that is supported on the housing 100 in example embodiments. FIG. 6 is a cross-section taken along line I-I' of FIG. 1. FIG. 7 illustrates an OIS driver 240 disposed between the supporter 220 and the housing 100 in example embodiments. FIG. 8 illustrates a structure that supports rotation of the supporter 220 on an opposite side of the ball group 33 in example embodiments. FIG. 9 illustrates a holder 230 supported on the supporter 220 in example embodiments. FIG. 9 is a cross-section taken along line II-II' of FIG. 1. FIG. 10 illustrates an OIS driver 250 disposed between the supporter 220 and the holder 230 in example embodiments.

Referring to FIGS. 6 to 10, the reflective module 200 may include the housing 100, the supporter 220 disposed in the housing 100, and the holder 230 connected to the supporter 220. The holder 230 may be fixedly coupled to the reflective member 210.

The supporter 220 may be rotatably coupled to the housing 100. The supporter 220 may be rotatably coupled to the housing 100 about the first axis A1. The first axis A1 may be perpendicular or substantially perpendicular to both the first optical axis C1 and the second optical axis C2. The holder 230 may be rotatably coupled to the supporter 220. The holder 230 may rotate about the second axis A2 with respect to the supporter 220. The second axis A2 may be parallel to or substantially parallel to the first optical axis C1.

In example embodiments, the reflective module 200 may include a first driver 240 that rotates the supporter 220 about the first axis A1 with respect to the housing 100, and a second driver 250 that rotates the holder 230 about the second axis A2 with respect to the supporter 220.

Referring to FIGS. 6 and 9, the first axis A1 and the second axis A2 may pass through an intersection point between the first optical axis C1 and the second optical axis C2, or may be positioned to be very close to the intersection point. For example, the first axis A1 and the second axis A2 may intersect the first optical axis C1 and the second optical axis C2. Accordingly, more predictable and accurate OIS driving may be implemented.

Referring to FIGS. 6 and 7, in example embodiments, the supporter 220 may include a base 221 disposed on a lower portion of the reflective member 210, and sidewalls 222 and 223 extending to oppose each other from opposite ends of the base 221 to opposite sides of the reflective member 210 in a longitudinal direction (for example, an X-direction). The reflective module 200 may include the first driver 240 that rotates the supporter 220 about the first axis A1 with respect to the housing 100. The first driver 240 may be disposed between the first sidewall 222 of the supporter 220 and the housing 100.

The moving body 20, the fixed body 10, the rotational axis A, and the OIS driver 30 described with reference to FIGS. 3 to 5 may respectively correspond to the supporter 220, the housing 100, the first axis A1, and the first driver 240 in FIGS. 6 to 8, respectively.

The first driver 240 may include some or all of a first driving magnet 241, a first driving coil 242, a first ball group 243, a first groove arrangement 244, a first guide groove 245, a first pulling magnet 246, and a first pulling yoke 247, and the above-described components may correspond to the driving magnet 31, the driving coil 32, the ball group 33, the groove arrangement 34, the guide groove 35, the pulling magnet 36, and the pulling yoke 37 described with reference to FIGS. 3 to 5.

For example, referring to FIGS. 6 and 7, the first driving magnet 241, the first groove arrangement 244, and the first pulling magnet 246 may be disposed in the supporter 220, and the first driving coil 242, the first guide groove 245 and the first pulling yoke 247 may be disposed in the housing 100. A first coil groove 100a in which at least a portion of the first driving coil 242 is accommodated may be further disposed in the housing 100.

In example embodiments, the reflective module 200 may include a shaft 224 that extends from the supporter 220. For example, as illustrated in FIGS. 6 and 8, the shaft 224 may extend from a second sidewall 223 or may be coupled to the second sidewall 223, and may extend along the first axis A1. The shaft 224 may support the rotation of the supporter 220. The supporter 220 may be supported in the housing by the shaft 224 and the first ball group 243 respectively disposed on opposite sides of the supporter 220. For example, a first side of the supporter 220 may be supported by a magnetic force between the first pulling yoke 247 and the first pulling magnet 246 and contact between the first ball group 243 and grooves 244 and 245. A second side of the supporter 220 may be rotatably supported by the shaft 224 being rotatably coupled to the housing 100 about the first axis A1.

Referring to FIG. 6, in a non-limited example, the shaft 224 may have a conical end 224a. The first driver 240 may include a support member 225 coupled to the housing 100. The shaft 224 may be fitted to the support member 225. The support member 225 may include an accommodating groove 225a having a "V"-shaped cross-section, and the end 224a of the shaft 224 may be accommodated in the groove 225a. That is, the end 224a of the shaft 224 may be supported with a vertex thereof in contact with the groove 225a of the support member 225. Through such a support structure, the housing 100 may reduce frictional force by minimizing a contact area between the supporters 220, thereby increasing a driving efficiency of the first driver 240. In another example embodiment, the support member 225 may be integrally formed with the housing 100. That is, a groove in which at least a portion of the shaft 224 is accommodated and supported may be disposed on at least a partial surface of the housing 100.

In one or more examples, in order to eliminate an unnecessary clearance on the first axis A1 between the support member 225 and the shaft 224, the OIS driver 30 may include an elastic member pushing the shaft 224. The elastic member may be, for example, a coil spring or a leaf spring. The elastic member may be mounted between the housing 100 and the support member 225 to push the first shaft 224 in a direction, parallel to the first axis A1.

FIG. 8 illustrates a shaft 224 and a support structure formed to be different from the structures of FIG. 6. That is, the shaft 224 and the support structure in FIG. 6 may be replaced with the shaft 224 and the support structure in FIG. 8. The end 224a of the shaft 224 extending from the supporter 220 may include a first accommodating groove 224b that partially accommodates the ball member 226, and the support member 225 may include a second accommodating groove 225a that accommodates the ball member 226 on an opposite side of the shaft 224. The grooves 224b and 225a of the shaft 224 and the support member 225 may have a "V" or "U"-shaped cross-section to accommodate the ball member 226. In this case, in order to minimize frictional force, the grooves 224b and 225a of the shaft 224 and the support member 225 may be in point contact or line contact with the ball member 226.

In one or more examples, the reflective module 200 may include a second driver 250 that rotates the holder 230 about the second axis A2 with respect to the supporter 220.

For example, referring to FIGS. 9 and 10, the holder 230 that supports the reflective member 210 may be rotatably disposed about the second axis A2, substantially perpendicular to the second optical axis C2, with respect to the supporter 220, and the second driver 250 may be disposed between the holder 230 and the base 221 of the supporter 220.

The moving body 20, the fixed body 10, the rotational axis A, and the OIS driver 30 described with reference to FIGS. 3 to 5 may correspond to the holder 230, the supporter 220, the second axis A2, and the second driver 250 in FIGS. 9 and 10, respectively.

The second driver 250 may include some or all of a second driving magnet 251, a second driving coil 252, a second ball group 253, a second groove arrangement 254, a second guide groove 255, a second pulling magnet 256, and a second pulling yoke 257, and the above-described components may correspond to the driving magnet 31, the driving coil 32, the ball group 33, the groove arrangement 34, the guide groove 35, the pulling magnet 36, and the pulling yoke 37 described with reference to FIGS. 3 to 5, respectively.

For example, referring to FIGS. 9 and 10, the second driving magnet 251, the second groove arrangement 254, the second driving magnet 251, and the second pulling magnet 256 may be disposed in the holder 230, and the second driving coil 252, the second guide groove 255, and the second pulling yoke 257 may be disposed in the supporter 220. A second coil groove 220a in which at least a portion of the second driving coil 252 is accommodated may be further disposed in the supporter 220.

In example embodiments, the holder 230 may rotate about the second axis A2 with respect to the supporter 220 to change a direction of a propagation path of light incident at various angles to a targeted direction (for example, the second optical axis C2).

The driving structures of the reflective module 200 described with reference to FIGS. 6 to 10 may be combined with each other. For example, the reflective module 200 may include the housing 100, the supporter 220 and the first driver 240 illustrated in FIGS. 6 and 7, and the second driver 250 may be disposed between the supporter 220 and the holder 230. Accordingly, pitch and yaw driving of the reflective member 210 may be implemented with respect to the housing 100.

Additionally, a ball group support structure, an application of the kinematic coupling structure, may be applied between the housing 100 and the supporter 220, and between the supporter 220 and the holder 230, thereby rotation of the supporter 220 and the holder 230 can be precisely controlled. Accordingly, a prism module may implement predictable and accurate OIS driving.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A reflective module assembly, comprising:
a fixed body;
a moving body configured to rotate with respect to the fixed body;
a reflective member disposed in the moving body, the reflective member configured to change a direction of a path of light incident in a first optical axis direction to a second optical axis direction;
three ball members spaced apart from a rotational axis of the moving body, the three ball members configured to rotatably support the moving body;
a groove arrangement disposed on at least one of the moving body and the fixed body, and configured to contact the three ball members; and
wherein the three ball members and the groove arrangement form six contact points, and
wherein a position of at least one of the three ball members is fixed within at least one of respective grooves of the groove arrangement.

2. The reflective module assembly of claim 1, wherein the rotational axis passes through a triangle having vertices located at centers of each of the three ball members.

3. The reflective module assembly of claim 1, wherein the three ball members are configured to have a kinematic coupling structure.

4. The reflective module assembly of claim 2, wherein the three ball members comprise a first ball member, a second ball member, and a third ball member disposed on a circumference of the rotational axis.

5. The reflective module assembly of claim 4, wherein the groove arrangement comprises:
a first groove configured to form two contact points with the first ball member;
a second groove configured to form three contact points with the second ball member; and
a third groove configured to form one contact point with the third ball member.

6. The reflective module assembly of claim 4, wherein:
the groove arrangement comprises three V-shaped grooves disposed on different positions of the at least one of the moving body and the fixed body, and
the three V-shaped grooves respectively form two contact points with one of the three ball members.

7. The reflective module assembly of claim 1, further comprising:
a guide groove disposed in the other of the moving body and the fixed body in which the groove arrangement is not disposed, the guide groove configured to extend along a circumference of the rotational axis,
wherein the three ball members are accommodated in the guide groove.

8. The reflective module assembly of claim 1, further comprising:

a driving coil and a driving magnet respectively disposed in one and the other of the moving body and the fixed body,
wherein the driving coil and the driving magnet oppose each other in a direction of the rotational axis.

9. The reflective module assembly of claim 8, wherein the driving magnet is configured to extend along a circular arc about the rotational axis.

10. The reflective module assembly of claim 8, wherein the driving magnet is disposed radially farther than the three ball members about the rotational axis.

11. The reflective module assembly of claim 1, further comprising:
a pulling magnet and a pulling yoke respectively disposed in one and the other of the moving body and the fixed body,
wherein the rotational axis passes through at least one of the pulling magnet and the pulling yoke.

12. The reflective module assembly of claim 1, comprising:
a housing;
a supporter that is rotatable with respect to the housing; and
a holder that is rotatable with respect to the supporter,
wherein the fixed body is the housing, the moving body is the supporter, and the rotational axis is perpendicular to both the first optical axis and the second optical axis.

13. The reflective module assembly of claim 12, comprising:
a shaft which extends along the rotational axis from one of the supporter and the housing, the shaft configured to have a conical end; and
an accommodating groove disposed in the other of the supporter and the housing, the accommodating groove configured to accommodate the conical end of the shaft.

14. The reflective module assembly of claim 12, comprising:
a shaft which extends from the supporter along the rotational axis, the shaft configured to have an end at which a first accommodating groove is disposed;
a support member coupled to the housing, the support member comprising a second accommodating groove which opposes the first accommodating groove in a direction of the rotational axis; and
a ball member which is fitted between the first accommodating groove and the second accommodating groove.

15. The reflective module assembly of claim 1, comprising:
a housing;
a supporter that is rotatable with respect to the housing; and
a holder that is rotatable with respect to the supporter,
wherein the fixed body is the supporter, the moving body is the holder, and the rotational axis is parallel to the first optical axis.

16. A camera module comprising:
the reflective module assembly of claim 1; and
a lens module configured to receive light emitted from the reflective member, the lens module comprising a plurality of lenses arranged in a direction of the second optical axis.

17. A reflective module assembly, comprising
a first body;
a second body rotatable about a rotational axis with respect to the first body;

a reflective member disposed in one of the first body and the second body, the reflective member configured to change a path of incident light;

three ball members disposed between the first body and the second body, and configured to move in a circumferential direction of the rotational axis;

a groove arrangement disposed in the first body, the groove arrangement configured to be in contact with the three ball members; and a guide portion disposed in the second body, the guide portion configured to guide a movement of the three ball members, wherein a position of at least one of the three ball members is fixed within at least one of respective grooves of the groove arrangement.

18. The reflective module assembly of claim 17, wherein the three ball members are configured to have a kinematic coupling structure.

* * * * *